United States Patent [19]

Henderson et al.

[11] Patent Number: 4,560,561

[45] Date of Patent: Dec. 24, 1985

[54] POULTRY FEED SUPPLEMENT AND METHOD OF MAKING

[75] Inventors: Charles J. Henderson, Nipomo; Gerald L. Cotton, Santa Maria, both of Calif.

[73] Assignee: Betteravia Byproducts Co., Santa Maria, Calif.

[21] Appl. No.: 591,017

[22] Filed: Mar. 19, 1984

[51] Int. Cl.$^4$ ............................................. A23K 1/02
[52] U.S. Cl. .................................... 426/74; 426/454; 426/658; 426/807
[58] Field of Search ................ 426/74, 623, 630, 807, 426/658, 454

[56] References Cited

U.S. PATENT DOCUMENTS

| | | | |
|---|---|---|---|
| 1,767,178 | 6/1930 | Herrick et al. | 426/807 X |
| 1,995,519 | 3/1935 | Reiner | 426/807 X |
| 2,152,438 | 3/1939 | McHan | 426/807 X |
| 2,162,609 | 6/1939 | Coleman | 426/807 X |
| 2,362,014 | 11/1944 | Lissauer et al. | 426/807 X |
| 2,403,010 | 7/1946 | McHan . | |
| 2,479,583 | 8/1949 | McHan . | |
| 2,668,749 | 2/1954 | McHan . | |
| 2,905,558 | 9/1959 | Adams . | |
| 2,940,856 | 6/1960 | Geisendorf et al. . | |
| 3,058,804 | 10/1962 | Tynan . | |
| 3,249,441 | 5/1966 | Reynolds et al. . | |
| 4,252,831 | 2/1981 | Gleckler et al. . | |

*Primary Examiner*—R. B. Penland
*Attorney, Agent, or Firm*—Henry M. Bissell

[57] ABSTRACT

An improved poultry feed supplement is provided by homogeneously mixing together, preferably utilizing both rotary and lateral oscillatory motions, waste lime from a sugar refining process and not in excess of about 20% of nutritive agglomerating constituent selected from the group consisting of beet molasses, cane molasses, wood molasses, citrus molasses, corn steep liquor, invert sugar solution and mixtures thereof. The moisture content of the mix is adjusted, if necessary, during mixing to about 18 to 23 weight percent, preferably about 21 weight percent, and the resulting mixture preferably is formed into pellets of an average diameter of about 1/16", which pellets are then dried to a hard stable form, with a moisture content of, for example, about 0 to 4 weight percent. The feed supplement is used to improve the strength of poultry egg shells. The supplement is simple, efficient and inexpensive to make and use. The supplement utilizes constituents which have heretofore generally been considered waste byproducts of the sugar refining process, thereby improving the efficiency of the overall process.

24 Claims, No Drawings

POULTRY FEED SUPPLEMENT AND METHOD OF MAKING

BACKGROUND OF THE INVENTION

1. Field of the Invention

The present invention generally relates to poultry feeds and, more particularly, to an improved poultry feed supplement.

2. Description of the Prior Art

Egg laying requires the ingestion and utilization by poultry of relatively large amounts of calcium, since egg shells largely comprise calcium in the form of calcium carbonate. Although poultry may ingest chips of calcium-bearing rock, for long-continued high-level egg production they require an additional source of calcium.

Various poultry feed supplements have been designed to provide poultry with the needed calcium and/or other nutrients. Conventional calcium-containing feed supplements utilize crushed limestone or crushed oyster shell, which is calcium carbonate, as the calcium source. See, for example, U.S. Pat. Nos. 2,403,010, 2,479,583, 2,668,749, 3,058,804 and 3,249,441. Such limestone is not assimilated very rapidly by the bird and such poultry feed supplements may fail to achieve the desired result of improved egg shell quality, particularly with older laying hens.

In many instances, despite the feeding of such a supplement, thin-walled low-shell-strength eggs are produced, resulting in high egg losses due to inadvertent shell crushing or fracture. It is also known that as egg production increases and/or the egg-laying population matures, calcium intake requirements rise and egg shell quality decreases. Older birds simply do not assimilate or metabolize calcium very efficiently.

Calcium has also been added with bone meal to poultry feed to improve broiler meat and egg color. See U.S. Pat. No. 2,940,856. Calcium phosphates have been coated with molasses to prevent dusting (see U.S. Pat. No. 4,252,831) and then fed to poultry. Lignosulfonates have also been used as feed supplements (see U.S. Pat. No. 2,905,558).

However, there remains a need to provide a more efficient calcium-containing poultry feed supplement which will improve the shell strength of eggs, even those of high production egg-laying strains and those of maturing poultry. The feed supplement should be inexpensive and simple to make and use from readily available ingredients.

SUMMARY OF THE INVENTION

The improved poultry feed supplement of the present invention and the method of making the supplement satisfy all the foregoing needs. The supplement and method are substantially as set forth in the Abstract. A supplement in accordance with the invention is formed by mixing together two ingredients; namely, at least about 89%, on a dry weight basis, of waste lime from a sugar refining process and not in excess of about 11%, on a dry weight basis, of a nutritive agglomerating constituent selected from the group consisting of beet molasses, cane molasses, wood molasses, citrus molasses, corn steep liquor, invert sugar solution and mixtures thereof. The moisture content of the mix is adjusted preferably to about 21 weight percent, as by spraying, if needed, during mixing, preferably through the use of rotary and lateral oscillatory motion. The mix is preferably formed into pellets about 1/16" in diameter and the pellets are then dried to about 0 to 5 weight percent moisture, preferably 1 to 3 percent, and to a hard, strong, stable form. Five percent moisture is acceptable where careful handling of the pellets can be assured. Above about 5% moisture, the pellets tend to crumble.

Adjustment during pelletizing to about 21% moisture has been found to be optimum. Pellets do form at a moisture content as low as about 18%, but the agglomeration into pellets may take an unduly long period of time. An acceptable range of moisture content is from about 18 to about 23% by weight. At about 23% moisture content, larger pellets are formed, up to about ½ inch in diameter. Such larger pellets can be dried, crumbled and then screened to realize agglomerated particles of a size suitable for the poultry feed supplement. Thus, although an extra production step is required, higher moisture contents of the mix can be accommodated.

When the dried mix, preferably in pellet form, is fed to poultry as a supplement, the very fine particle size of the calcium, in contrast to conventional ground limestone used in conventional poultry feeds, enables it to be more rapidly and efficiently reacted with hydrochloric acid that is present in the digestive tract of a chicken. Thus the calcium of this supplement is more rapidly assimilated and available for shell formation than conventional supplements. 83% of the calcium carbonate waste lime is less than 74 microns in diameter. This small particle size and the manner by which the calcium of the waste lime is formed are believed responsible for the improved effectiveness of our poultry feed supplement for egg production.

The egg shells of poultry fed this improved supplement are thicker, stronger and harder than the egg shells of poultry fed on conventional feed supplements. Moreover, the agglomerating constituent provides a desirable high calorie nutrient source while also performing its agglomerating effect. The pellets produced by the present method are small, hard, durable and easy and inexpensive to produce. They are easily added to poultry feed rations and do not stick to each other or to the feed. Their preferred average 1/16" diameter size allows them to be easily picked up by the poultry and swallowed, and the rapid dissolving of the molasses or other constituent in the chicken's digestive tract allows immediate access to the waste lime which has a very large surface area. Thus, the calcium becomes available more readily for the formation of hard egg shells, and thin walled fragile eggs are not laid. Further features of the present invention are set forth in the following detailed description.

DESCRIPTION OF THE PREFERRED EMBODIMENTS

The improved poultry feed supplement of the present invention improves the shell strength of egg producing poultry and consists of waste lime and a nutritive agglomerating constituent selected from the group consisting of beet molasses, cane molasses, wood molasses, citrus molasses, corn steep liquor, invert sugar solution and mixtures thereof.

The waste lime is that which is derived from a sugar refining process. Waste lime comprises precipitated calcium carbonate and non-sugar organic matter removed during precipitation of calcium carbonate. Heretofore, large quantities of waste lime have been thrown away, little use having been found for the same. Currently, only small quantities of waste lime are sold commercially, its use being principally as a neutralizing agent in croplands that are overly acidic.

Usually, the calcium carbonate in the waste lime is present in a concentration of about 78 to about 85%, by weight on a dry basis, with the non-sugar organic matter comprising the remainder. Although the exact nature of the organic matter will vary, depending on what raw materials are being used in the sugar refining process, e.g. sugar cane, sugar beets, etc., the organic matter in fresh waste lime does contain digestible nutrients which can supplement poultry feed. Such nutrients are, for example, lignins, organic salts, organic acids, celluloses, sugars, trace elements, etc. For a sugar beet refining process, these are basically the organics of anaerobically decomposed sugar beet plant material. The organic matter may also include aerobically decomposed plant material from various weeds that grow on the waste pile perimeter.

The moisture content of waste lime by itself is usually about 25% by weight, which makes it difficult to handle in the pelletizing process without pre-drying. Furthermore, it is preferred to use fresh waste lime rather than old waste lime, since it is easier to form into pellets, contains a greater proportion of usable organic nutrients and is more rapidly and effectively assimilated by the bird.

Beet molasses, cane molasses, wood molasses, citrus molasses, invert sugar solutions and corn steep liquors are all obtained as by-products of sugar or sugar-like refining processes and are usable without modification in the present method and supplement. All are readily available from the same refining process.

The waste lime and nutritive agglomerating constituent are mixed homogeneously, in accordance with the present method, in a mixing zone, such as a mechanical stirrer or oscillator, preferably utilizing both rotary and lateral oscillatory motion for the mixing, while adjusting, if necessary, the moisture content of the mixture to about 21% by weight, as by spraying a fine mist of water on the surface of the mixture. This helps the mixture to fully blend and rapidly form, in accordance with the present method, small, spherical pellets of 1/16" average diameter or the like. Other pellet sizes and shapes can be used. The pellets are then dried in an oven or the like to about 0 to 4 weight percent moisture, preferably 1 to 3 percent moisture, and at that point are very hard and strong, crush-resistant and durable. They do not readily form mold and do not stick to each other or to feed with which they may then be mixed.

The waste lime in the mixture is at least about 80% by weight, on a dry basis, of the mixture, the nutritive agglomerating constituent being the remainder (20% or less) of the mixture (except for water). That constituent adds a nutritive high calorie source to the supplement, reduces the moisture content of the lime and, most importantly, agglomerates with the lime to readily form the desired pellets or related particle form which can easily be dried. It has been found that relatively less of the nutritive agglomerating constituent is needed as the concentration of invert sugar in that constituent increases. Thus, there is an inverse ratio of nutritive agglomerating constituent in the binder material to the amount of binder material required for satisfactory pellet strength properties. The exact amount of nutritive agglomerating constituent to be used will therefore depend on the particular molasses, steep liquor or invert sugar solution which is employed, since each differs in invert sugar content. All are, however, suitable for use in the present method and supplement. Sugar molasses is preferred because it is very rapidly available and produces superior strength pellets. Corn steep liquor is the least desirable from this standpoint. Another factor to consider in selecting the agglomerating constituent is the fact that the cost of manufacture rises in proportion to the percentage of agglomerating constituent in the product. Further aspects of the present invention are set forth in the following specific examples.

EXAMPLE I

An improved poultry feed supplement was provided in a first test, Test A, by homogeneously mixing together, in a mixing machine employing rotary and lateral oscillatory motion, about 89 pounds, on a dry weight basis, of fresh waste lime from a sugar beet refining process after partial drying from 50 weight percent moisture content to 24 weight percent moisture content, and 11 pounds, on a dry weight basis, of sugar beet molasses from the same type of sugar refining process. The average particle size of more than 83% of the calcium carbonate in the waste lime was less than 74 microns. In the waste lime of the examples herein, the organic matter was so thoroughly decomposed that all organic particles were less than 74 microns in diameter. The moisture content of the mixture was adjusted to 21 weight percent and pelletizing was aided by spraying a fine water mist on the surface of the mixture during the mixing, whereupon 1/16" diameter pellets were formed from the mixture and dried in an oven at about 150° F. to about 1 weight percent moisture content. The pellets (Pellets A) were then ready for use.

Comparable parallel Tests B, C, D, E and F substituting cane molasses, wood molasses, citrus molasses, corn steep liquor and invert sugar solutions, respectively, in the above-described Test A procedure were carried out and the results are summarized below in Table I.

TABLE I

| Test | %, Dry Weight, of Waste Lime | %, Dry Weight, of Agglomerating Constituent | Pellet Condition |
| --- | --- | --- | --- |
| A | 89% | 11% beet molasses | strong-hard |
| B | 89% | 11% cane molasses | strong-hard |
| C | 96% | 4% wood molasses | strong-hard |
| D | 89% | 11% citrus molasses | strong-hard |
| E | 89% | 11% corn steep liquor | slightly soft |
| F | 91% | 9% invert sugar solution | strong-hard |

Test A pellets were fed to one group of old laying chickens in the same calcium concentration as a conventional ground limestone feed supplement which was fed to a control group of laying chickens of the same type and age. The eggs obtained were then tested for shell mass by determining whether or not they would float in a saline solution of 1.080 specific gravity. A total of 61% of the control groups eggs floated while only 16% of the eggs of the test group fed Test A pellets floated. A subsequent subjective test of breaking eggs from the two groups by hand established that there was a substantial average increase in the shell strength of eggs from the test group fed Test A pellets over the shell strength of the control group eggs.

It has been found that some variations can be made in the proportions of the waste lime to the nutritive agglomerating constituent and in the initial and final moisture content of the pellets while still retaining most of the advantages of the present method and supplement.

For example, test C of Table I has been modified, utilizing 97%, dry weight, of waste lime and 3% of wood molasses. The resulting pellets were suitable for use, although the pellet condition was rated as slightly soft. Also, tests have shown that the dry weight percentage of the waste lime in the mix with molasses as the agglomerating constituent can be as low as about 80% (within a range of from about 80 to about 97%) with the percentage of the agglomerating constituent being adjusted accordingly. As the percentage of waste lime is reduced, the pellets tend to become harder. Less than about 80% waste lime is generally not desirable because the percentage of molasses in excess of 20% could have an unfavorable laxative effect on the poultry to which the supplement is to be fed. A suitable range for the percentage of the beet molasses, cane molasses, and citrus molasses as the agglomerating constituent in the mix is from about 10% to about 20% dry weight, the percentage of waste lime being adjusted accordingly. For wood molasses as the agglomerating constituent, the permissible range is from about 3% to about 20%, the waste lime varying correspondingly from about 97% to about 80%. The range of corn steep liquor as the agglomerating constituent is from about 11% to about 20%. The range of the invert sugar solution as the agglomerating constituent is from about 8% to about 20% dry weight.

The supplement is particularly simple and inexpensive, employing normally discarded ingredients in a simple, rapid, low cost method which is suitable for high volume commercial production. The supplement is suitable for wild and domestic fowl, including chickens, turkeys, geese, ducks, partridges, pheasants and other pen-raised poultry. It is pleasant and attractive to the birds and of convenient size and shape for combination with generally available feeds. Other advantages are set forth hereinabove.

Although there have been described above specific arrangements of an improved poultry feed supplement and method of making the same in accordance with the invention for the purpose of illustrating the manner in which the invention may be used to advantage, it will be appreciated that the invention is not limited thereto. Accordingly, any and all modifications, variations or equivalent arrangements which may occur to those skilled in the art should be considered to be within the scope of the invention as defined in the annexed claims.

What is claimed is:

1. An improved poultry feed supplement for improving the shell strength of eggs, said supplement being dried pellets consisting of:
   (a) about 80–97%, on a dry weight basis, waste lime from a sugar refining process, said waste lime containing about 78–85% on a dry weight basis of calcium carbonate particles at least 83% of which are less than about 74 microns in diameter, and non-sugar organic particles; and
   (b) a nutritive agglomerating constituent selected from the group consisting of beet molasses, cane molasses, wood molasses, citrus molasses, corn steep liquor, invert sugar solutions and mixtures thereof, said pellets having a moisture content of about 0–5 weight percent, whereby the rate of absorption and extent of use of said calcium carbonate in said waste lime by poultry are improved in order to provide stronger egg shells.

2. The poultry feed supplement of claim 1 wherein said pellets are about 1/16″ in diameter and have an initial moisture content of about 21 weight percent of said supplement before drying.

3. The poultry feed supplement of claim 2 wherein said waste lime is fresh waste lime.

4. The poultry feed supplement of claim 2 wherein the average moisture content of the pellets, after drying, is in the range of about 1 to 3 weight percent.

5. The poultry feed supplement of claim 1 wherein said nutritive agglomerating constituent is beet molasses and is present in a concentration of about 11% while said waste lime is present in a concentration of about 89%, on a dry weight basis.

6. The poultry feed suplement of claim 1 wherein said nutritive agglomerating constituent is cane molasses and is present in a concentration of about 11% while said waste lime is present in a concentration of about 89%, on a dry weight basis.

7. The poultry feed supplement of claim 1 wherein said nutritive agglomerating constituent is wood molasses and is present in a concentration of about 4% while said waste lime is present in a concentration of about 96%, on a dry weight basis.

8. The poultry feed supplement of claim 1 wherein said nutritive agglomerating constituent is wood molasses and is present in a concentration of about 3% while said waste lime is present in a concentration of about 97%, on a dry weight basis.

9. The poultry feed supplement of claim 1 wherein said nutritive agglomerating constituent is citrus molasses and is present in a concentration of about 11% while said waste lime is present in a concentration of about 89%, on a dry weight basis.

10. The poultry feed supplement of claim 1 wherein said nutritive agglomerating constituent is corn steep liquor and is present in a concentration of about 11% while said waste lime is present in a concentration of about 89%, on a dry weight basis.

11. The poultry feed supplement of claim 1 wherein said nutritive agglomerating constituent is invert sugar solution and is present in a concentration of about 9% while said waste lime is present in a concentration of about 91%, on a dry weight basis.

12. The poultry feed supplement of claim 1 wherein said nutritive agglomerating constituent is a mixture of at least two constituents selected from the group consisting of beet molasses, cane molasses, wood molasses, citrus molasses, corn-steep liquor and invert sugar solution.

13. An improved method of making a calcium-containing poultry feed supplement, said method consisting essentially of:
   (a) homogeneously mixing about 80–97%, on a dry weight basis, of waste lime from a sugar refining process with an agglomerating concentration of up to 20%, on a dry weight basis, of a nutritive agglomerating constituent selected from the group consisting of beet molasses, cane molasses, wood molasses, citrus molasses, corn steep liquor, invert sugar solutions and mixtures thereof, while adjusting the moisture content of the resultant mixture in a range of about 18 to 23 weight percent, said waste lime containing non-sugar organic particles and about 78–85% on a dry weight basis of calcium carbonate particles at least 83% of which are less than 74 microns in diameter;
   (b) forming said mixture into pellets; and
   (c) drying said pellets to a stable usable form and a moisture content of about 0–5%, by weight whereby the rate of absorption and extent of use of said calcium carbonate in said waste lime by poultry are improved in order to provide stronger egg shells.

14. The method of claim 13 wherein the step of adjusting the moisture content of the mixture comprises adjusting to a moisture content of about 21 weight percent and wherein the formed pellets are about 1/16 inch diameter.

15. The method of claim 14 wherein the final moisture content is in the range of about 1 to 3 weight percent.

16. The method of claim 14 wherein said mixing is effected in a mixing zone which imparts both rotary motion and lateral oscillation during said mixing, and wherein said moisture content adjusting is effected by spraying said mixture with a fine water mist during said mixing.

17. The method of claim 13 further including the steps of screening the formed pellets and crumbling those which are substantially in excess of 1/16 inch diameter to develop formed particles of acceptable size.

18. The method of claim 13 wherein said mixture agglomerating constituent is beet molasses and is present in a concentration of about 11 percent, on a dry weight basis, in said pellets.

19. The method of claim 13 wherein said mixture agglomerating constituent is cane molasses and is present in a concentration of about 11 percent, on a dry weight basis, in said pellets.

20. The method of claim 13 wherein said mixture agglomerating constituent is wood molasses and is present in a concentration of about 4 percent, on a dry weight basis, in said pellets.

21. The method of claim 13 wherein said mixture agglomerating constituent is wood molasses and is present in a concentration of about 3 percent, on a dry weight basis, in said pellets.

22. The method of claim 13 wherein said mixture agglomerating constituent is citrus molasses and is present in a concentration of about 11 percent, on a dry weight basis, in said pellets.

23. The method of claim 13 wherein said mixture agglomerating constituent is corn steep liquor and is present in a concentration of about 11 percent, on a dry weight basis, in said pellets.

24. The method of claim 13 wherein said mixture agglomerating constituent is invert sugar solution and is present in a concentration of about 9 percent, on a dry weight basis, in said pellets.

* * * * *